US011376954B2

(12) United States Patent
Müller et al.

(10) Patent No.: US 11,376,954 B2
(45) Date of Patent: Jul. 5, 2022

(54) PTO TRANSMISSION

(71) Applicant: Deere & Company, Moline, IL (US)

(72) Inventors: David Müller, Dettenheim (DE); Rainer Gugel, Plankstadt (DE)

(73) Assignee: DEERE & COMPANY, Moline, IL (US)

(*) Notice: Subject to any disclaimer, the term of this patent is extended or adjusted under 35 U.S.C. 154(b) by 240 days.

(21) Appl. No.: 16/904,147

(22) Filed: Jun. 17, 2020

(65) Prior Publication Data

US 2020/0324648 A1 Oct. 15, 2020

Related U.S. Application Data

(62) Division of application No. 15/782,217, filed on Oct. 12, 2017, now Pat. No. 10,723,225.

(30) Foreign Application Priority Data

Oct. 14, 2016 (DE) ........................ 102016220130.1

(51) Int. Cl.

| | |
|---|---|
| ***B60K 17/28*** | (2006.01) |
| ***B60W 30/188*** | (2012.01) |
| ***F02D 41/02*** | (2006.01) |
| ***B60K 25/06*** | (2006.01) |
| ***F16H 3/085*** | (2006.01) |

(Continued)

(52) U.S. Cl.

CPC .............. *B60K 17/28* (2013.01); *B60K 25/06* (2013.01); *B60W 30/1888* (2013.01); *F02D 41/0205* (2013.01); *F16H 3/085* (2013.01); *F16H 3/091* (2013.01); *F16H 3/093* (2013.01); *B60Y 2200/221* (2013.01); *B60Y 2400/4244* (2013.01); *F16H 59/02* (2013.01);

(Continued)

(58) Field of Classification Search

None

See application file for complete search history.

(56) References Cited

U.S. PATENT DOCUMENTS 8,092,342 B2 * 1/2012 Eriksson ............ B60W 30/184
477/115

FOREIGN PATENT DOCUMENTS

| | | |
|---|---|---|
| DE | 3901229 A1 | 8/1990 |
| DE | 102011084623 A1 | 4/2013 |

(Continued)

OTHER PUBLICATIONS

European Search Report issued in counterpart application No. 17196168.3 dated Feb. 19, 2018. (13 pages).

(Continued)

*Primary Examiner* — Dirk Wright

(57) ABSTRACT

A method for shifting a PTO transmission includes selecting a PTO output speed from one of a first PTO speed and a second PTO speed of the PTO transmission, operating the PTO transmission in a reduced power mode at the selected PTO speed, the reduced power mode providing lower power to the PTO transmission at the selected PTO speed than a normal operating mode, comparing an instantaneous drive power to a maximum drive power in the reduced power mode, and when the instantaneous drive power exceeds the maximum drive power, automatically shifting the PTO transmission under load from the reduced power mode to the normal operating mode and automatically adjusting a transmission ratio of a vehicle transmission.

2 Claims, 6 Drawing Sheets

10

(51) Int. Cl.

| | |
|---|---|
| ***F16H 3/091*** | (2006.01) |
| ***F16H 3/093*** | (2006.01) |
| *F16H 61/02* | (2006.01) |
| *F16H 37/04* | (2006.01) |
| *F16H 59/02* | (2006.01) |

(52) U.S. Cl.

CPC .... *F16H 61/0213* (2013.01); *F16H 2037/045* (2013.01); *F16H 2200/0043* (2013.01)

(56) References Cited

FOREIGN PATENT DOCUMENTS

| | | | | |
|---|---|---|---|---|
| DE | 102015211049 A1 | | 12/2016 | |
| EP | 2675680 A1 | | 12/2013 | |
| EP | 2675680 B1 | | 4/2016 | |
| WO | WO-2007030069 A1 | * | 3/2007 | ............. B60K 25/06 |
| WO | WO-2007030070 A1 | * | 3/2007 | ............. B60K 25/06 |
| WO | WO-2016202515 A1 | * | 12/2016 | ............. F16H 3/085 |
| WO | WO2016202515 A1 | | 12/2016 | |

OTHER PUBLICATIONS

European Search Report issued in counterpart application 10 2016 220 1 30.1, dated Aug. 9, 2017, (10 pages).

* cited by examiner

PTO TRANSMISSION

RELATED APPLICATIONS

This application is a divisional of U.S. application Ser. No. 15/782,217, which claims priority to German Application Ser. No. 102016220130.1, filed Oct. 14, 2016, the disclosures of which are hereby incorporated by reference in their entirety.

FIELD OF THE DISCLOSURE

The present disclosure relates to a transmission for a power takeoff shaft on agricultural utility vehicles and a method for controlling it.

BACKGROUND

Conventionally, power takeoff shafts are provided at the front and rear ends of agricultural vehicles. With the power takeoff shaft, also called the PTO, hitched implements that are used in field operations can be provided with power.

The implements can require different drive torques and rotary speeds. For this reason, there are known PTO transmissions that make available different rotary speeds. The known PTO transmissions enable a shifting of the shaft mode of operation in a no-load state.

The usual rotary speeds of the PTO are 540 and 1000 rpm. In addition to these, gears that have the same rotary speed but which can be operated with a lower drive power of the agricultural vehicle are also conventional. They enable a savings of fuel or drive energy.

DE 102011084623A1 shows an example of a PTO transmission with a load-shiftable PTO transmission.

SUMMARY

In one embodiment of the present disclosure, a PTO transmission, with a PTO control system, an input shaft, a first output shaft, a parallel intermediate shaft, a second output shaft that is coaxially disposed with respect to the first output shaft, four gear pairs that are disposed so that the input shaft has two gears, the first output shaft has three gears, the intermediate shaft has two gears, and the second output shaft has one gear, so that two gear pairs are in engagement between the input shaft and the first output shaft, one gear pair is in engagement between the first output shaft and the intermediate shaft, and one gear pair is in engagement between the intermediate shaft and the second output shaft, where at least one gear per gear pair can be shifted.

The PTO transmission provides four gear steps, which enable different rotary speeds or different power outputs for the PTO in operation. A compact PTO transmission is made available. With the ability of the gears to be shifted, a matched shifting strategy can be realized so that, through the shiftable gears, the gears are in a free running state or are connected to the relevant shaft, as desired. In neutral position, the gears thus run freely and do not transmit any power. A connection can be made between the shafts through the shiftable gears.

Multi-plate clutches or jaw clutches, among others, are possibilities for shifting the gears. Multi-plate clutches enable the shifting operation under load, so that abrupt changes in the power path are avoided. Jaw clutches require disconnection of the power path for shifting, but enable a construction with a lower space requirement than a multi-plate clutch.

According to another embodiment, the input shaft can have at least one shifter element, and the first output shaft can have at most two shifter elements with which the gears can be shifted.

The arrangement of the shifter elements enables the gears to be connected non-rotatably to their relevant shaft or to operate them in free running state. A compact construction can be realized in the case of an arrangement that operates two gears with one shifter element. It is possible to shift two gear pairs by one shifter element on the input shaft, and also on the first output shaft. The intermediate shaft in this case can have no shifter elements and can be realized with a lower space requirement.

In another embodiment, the input shaft can be connected to the first output shaft through the at least one shifter element on the input shaft, and the first output shaft can be connected to the input shaft and to the second output shaft by the at most two shifter elements of the first output shaft, or the input shaft can be connected to the first output shaft, the intermediate shaft, and the second output shaft.

The PTO is provided with drive power through the second output shaft. By means of the shifter elements, a shift can be made between the two gear pairs of the input shaft and between the power output path, which leads directly from the first to the second output shaft, or from the first output shaft to the second output shaft via the intermediate shaft. With this strategy, four different power output paths can be made available.

In another embodiment, a PTO transmission includes a PTO control system, a first input shaft, a second input shaft, a first output shaft, a parallel intermediate shaft, a second output shaft that is coaxially disposed with respect to the first output shaft, four gear pairs that are disposed so that the second input shaft has two gears, the first output shaft has three gears, the intermediate shaft has two gears, and the second output shaft has one gear, so that two gear pairs are in engagement between the second input shaft and the first output shaft, one gear pair is in engagement between the first output shaft and the intermediate shaft, and one gear pair is in engagement between the intermediate shaft and the second output shaft, where at least one gear of each gear pair can be shifted.

This design enables four gear steps, which allow different speeds or different power outputs for the PTO to be provided. A compact PTO transmission is made available. With the ability to shift the gears, an adjusted shift strategy can be realized where, through the shiftable gears, the gears are in a free running state or are connected to the relevant shaft as desired. In neutral position, the gears thus run freely and do not transmit power. A connection can be made between the shafts through the shiftable gears. The first input shaft can be decoupled from the second input shaft, so that a disconnection of the PTO is enabled.

In one embodiment, the second input shaft can have at least one shifter element, and the first output shaft can have at most two shifter elements with which the gears can be shifted.

The arrangement of the shifter elements enables the gears to be connected non-rotatably to their relevant shaft or to operate them in free running state. A compact construction can be realized in the case of an arrangement that operates two gears with one shifting element. It is possible to shift two gear pairs by one shifter element on the input shaft, and also on the first output shaft. The intermediate shaft in this case can have no shifter elements and can be realized with a lower space requirement.

In one embodiment, the second input shaft can be connected to the first output shaft through the at least one shifter element on the second input shaft, and the first output shaft be connected to the second input shaft and to the second output shaft through the at most two shifter elements of the first output shaft, or the second input shaft can be connected to the first output shaft, the intermediate shaft, and the second output shaft.

The PTO is provided with power through the second output shaft. With the help of the shifter elements, a shift can be made between the two gear pairs of the second input shaft and between the power output path, which goes directly from the first to the second output shaft, or from the first output shaft via the intermediate shaft to the second output shaft. With this strategy, four different power output paths can be provided.

In another embodiment, the shifter elements can be designed to be shiftable under load or shiftable under no-load conditions.

With the help of shifter elements that can be shifted under load, for instance a multi-plate clutch, an adjustment of the PTO transmission, and in general the operation of the PTO can be undertaken during the operation of the PTO without disconnection of the drive train. This leads to a higher quality in the operability of the PTO and in the adjustment of the vehicle parameters. Vehicle parameters can be the rotary drive speed of the agricultural vehicle, or also the gear speed selection of an automatic vehicle transmission, which is usually additionally provided in the case of agricultural vehicles.

In another embodiment, at least one of the shifter elements on the second output shaft can have a neutral position.

The neutral position of the shifter element enables a deactivation of the operation of the PTO. In the neutral position, the relevant gear is not connected to the shaft and is in a free running state. This can be used to actively brake the gear, for instance by a brake. The braking can be necessary, since a drag torque can be produced through the shifter element, for example a multi-plate clutch, by friction of the hydraulic oil that is used, which can lead to rotation of the PTO even in the neutral position of the shifter element.

Another development of the disclosure concerns a method for shifting a PTO transmission that has a PTO transmission according to one of the preceding claims, a vehicle control system to control an automatic vehicle transmission, a vehicle transmission, and a PTO transmission, where an instantaneous drive power output is available to the vehicle control system. The power output is compared to a maximum power output pertinent to a PTO transmission gear step for operation at reduced drive rotary speed, and if the maximum drive power output is exceeded, it undertakes a gear shift of the PTO transmission, and a gear ratio adjustment of the vehicle drive is undertaken so that the drive rotary speed is set to an operating point with higher power output availability.

The vehicle and the PTO transmission are operated, when possible, in reduced power output mode by the vehicle control system. If necessary, a shift to a so-called normal mode takes place, which allows the full power output, but also brings a higher fuel requirement for the vehicle drive.

If necessary, the power output for the PTO is raised to a higher level by the vehicle control system, and adaptive operation of the PTO to changing vehicle requirements is enabled.

The method enables an automatic shifting of the power output path of the PTO transmission that runs without interruption of the tractive power of the PTO.

In another embodiment, an instantaneous drive output power can be available at the vehicle control system, and is compared to a maximum drive power output belonging to a PTO transmission gear step for operation at reduced drive rotary speed. If the maximum power output is exceeded, a gear shift of the PTO transmission and a transmission ratio adjustment of the vehicle transmission are undertaken so that the rotary speed of the drive is adjusted to an operating point with lower power output availability.

The method thus automatically reduces the power output available for the PTO to the reduced power level when the power requirements on the PTO decrease. This ensures a savings of fuel, and at the same time wear can be reduced and a high drive load on the PTO transmission is avoided.

In another development, the vehicle control system can remain the operating configuration consisting of vehicle transmission ratio, PTO transmission gear step, and drive rotary speed, if the newly determined operating configuration corresponds to the current configuration.

The method tests to see if the requirements on the PTO transmission change, resets the control system according to the current requirements, or makes an evaluation that a change to a different power output mode is not necessary. Unnecessary shifting operations of the vehicle transmission and acceleration operations of the drive are avoided, through which wear of the vehicle can also be reduced.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

One embodiment of the present disclosure can be used in an agricultural utility vehicle 10 in order to enable a PTO to provide drive power to implements. On such a utility vehicle, the PTO is usually provided at the front and rear of the vehicle. An additional PTO transmission, which provides the PTO with drive power and enables the control of the PTO, is necessary for this.

PTO speeds of 540 and 1000 rpm are conventional. It is additionally possible to operate the PTO at said speeds at a reduced power mode. The PTO is then provided with a lower drive power. This leads to a savings of drive energy.

Figure 1:
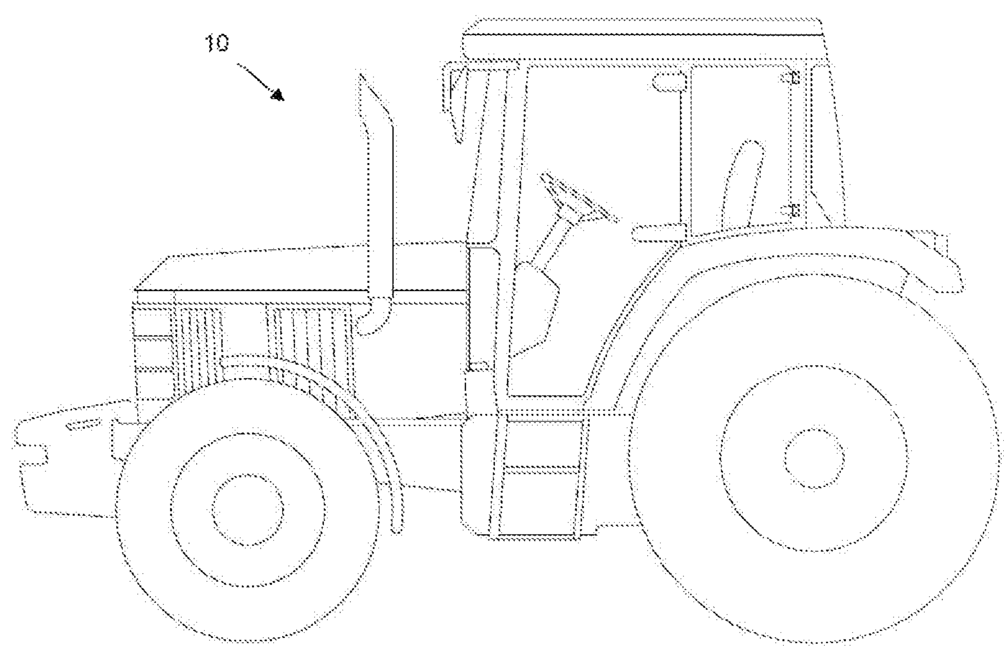
FIG. 1 shows the use of a PTO transmission in an agricultural vehicle.
Figure 2:
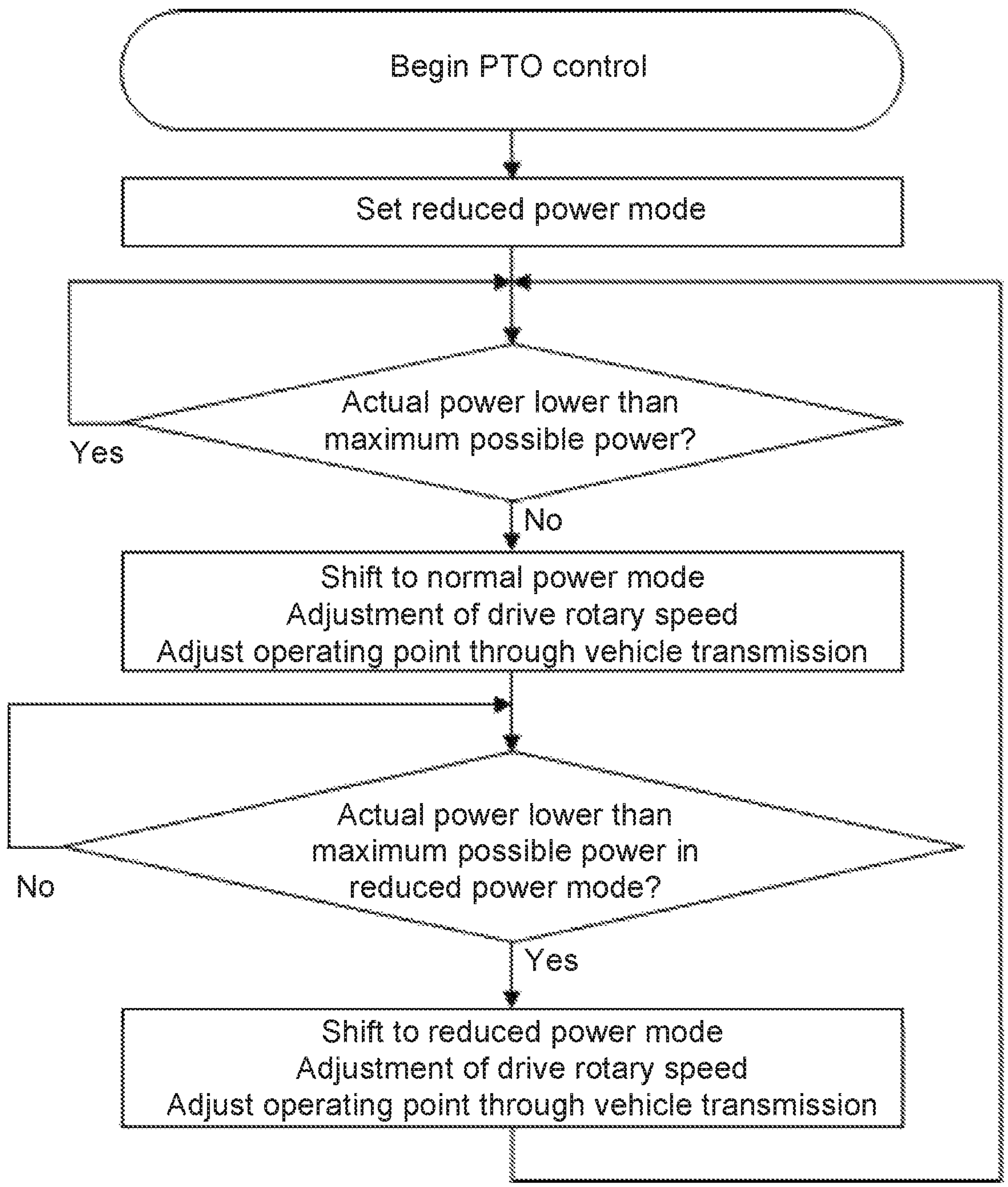
FIG. 2 shows the flow of a method for a PTO transmission.

FIG. 2 shows the flow of a control system according to the present disclosure for a PTO transmission 20. It includes a vehicle control system, which controls an automatic vehicle transmission, the vehicle drive, and the PTO transmission 20. Usually, the PTO is in a reduced power mode when possible.

For a specific vehicle status with a selected PTO speed, the vehicle control system determines an appropriate power level for the drive. The load on the drive can be changing and is determined by other external factors such as slope or tractive load, electric or hydraulic loads.

The vehicle control system also registers the current status of the vehicle transmission and determines a current operating point of the vehicle. From that, the current maximally possible power output for the drive is determined. The instantaneous drive power that is present in reduced power mode is compared to the measured value of a maximum drive power. For the case where the present power does not exceed the measured value, no intervention takes place through the vehicle control system.

If the measured value of the maximum possible power is exceeded by the currently present power in reduced power mode, a shifting of the PTO control from a reduced power mode to normal operating mode, which makes available higher power to the PTO, takes place due to the vehicle control system. This shifting takes place through controlled shifting operations in the PTO transmission 20, where, through the PTO transmission 20 according to the present disclosure, a shifting can take place under load.

At the same time, through the vehicle control system, an increase of the rotary speed of the vehicle drive takes place in order to guarantee a corresponding increase of power and an adjustment of the vehicle drive through a corresponding gear shift. Thus, the vehicle control system autonomously reacts to an increased drive power requirement without the operator having to undertake a manual adjustment of the PTO control system, the gas pedal for the vehicle drive, and the vehicle transmission.

If the PTO control system is in normal operating mode, the vehicle control system determines whether or not a maximum possible power in reduced power mode will be exceeded by the currently present power of the drive. If this condition is satisfied, the PTO control is shifted to the reduced-power mode by the vehicle control system, and the depicted flow runs in the reverse sequence.

Figure 3:
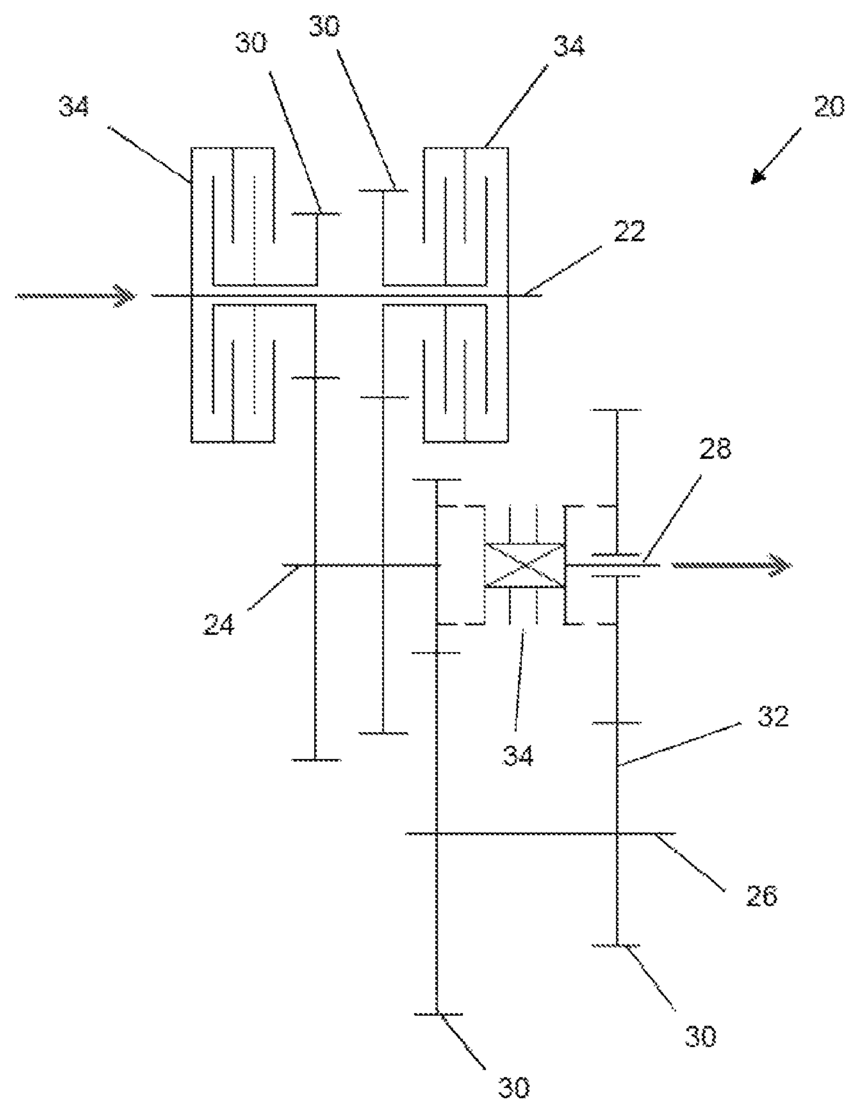
FIG. 3 shows an embodiment of a PTO transmission.

FIG. 3 shows a PTO transmission 20 according to the present disclosure. The PTO transmission 20 has an input shaft 22, a first output shaft 24, a second output shaft 28, and an intermediate shaft 26. On the input shaft 22 there are two gears 32, each of which is connected to the input shaft 22 via a shifter element 34. Through the actuation of the relevant shifter element, the gears 32 can be connected non-rotatably to the input shaft 22. The gears 32 are in engagement with two associated gears 32 on the first output shaft 24. With these, they each form a gear pair 30 which, at the appropriate position of shifter element 34, can transmit torque and rotary speed from the input shaft 22 to the first output shaft 24. The first output shaft 24 has three gears 32, of which two form two gear pairs together with the gears 32 of the input shaft 22. The third gear 32 of the first output shaft 24 is in engagement with a gear 32 of the intermediate shaft 26 and forms a third gear pair 30. On the second output shaft 28 there is an additional gear 32, which is in engagement with a second gear 32 on the intermediate shaft 26. Between the third gear 32 of the first output shaft 24 and the gear 32 of the second output shaft 28 there is an additional shifter element 34, which can be shifted so that either the gear 32 of the first output shaft 24 is connected to the shaft or the gear 32 of the second output shaft 28 is connected to the shaft.

On the intermediate shaft 26 there are two additional gears 32, which each form with the third gear 32 of the first output shaft 24 or the gear 32 of the second output shaft 28 a third and fourth gear pair 30 through the shifting of the shifter element 34. Between the first output shaft 24 and the second output shaft 28, the power path to the PTO is shifted so that it is directed from the first input shaft 22 via the first output shaft 24 either directly via the second output shaft 28 or via the input shaft 26 and the second output shaft 28. Through the design of one or more shifter elements 34 as a shifter element that can shift under load, an automatic shifting controlled by the vehicle control system can be enabled when necessary.

Figure 4:
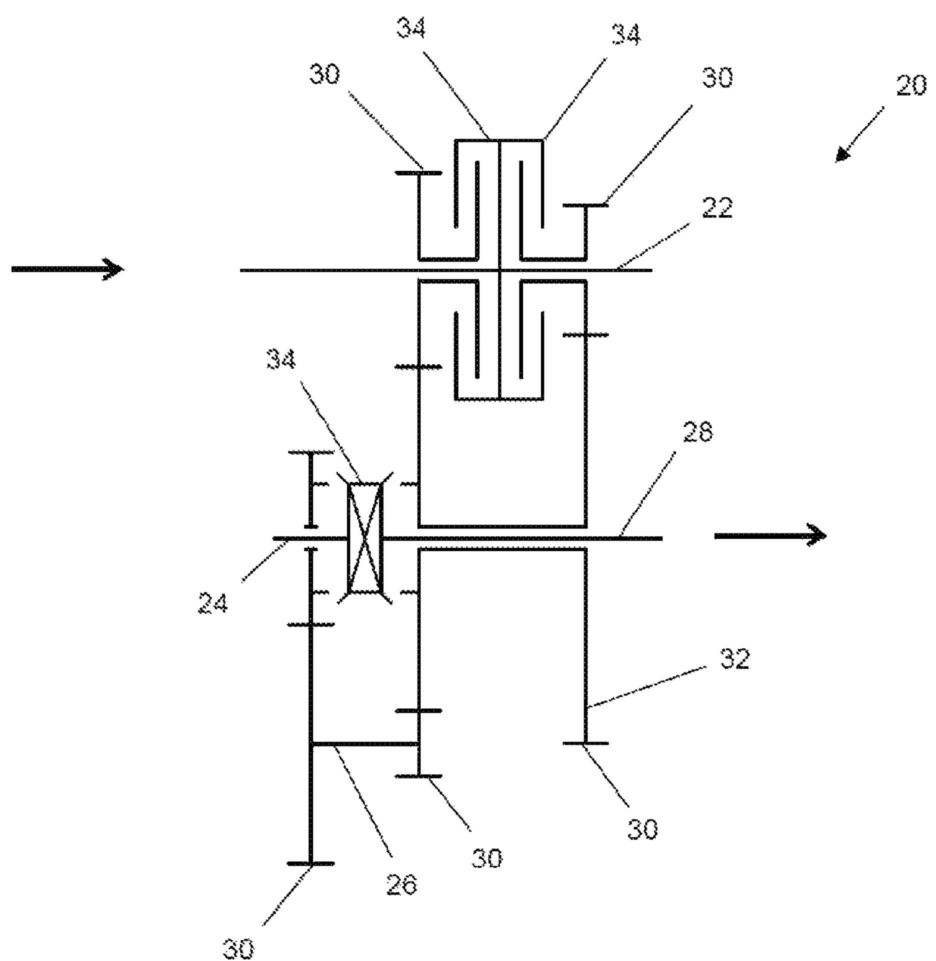
FIG. 4 shows another embodiment of a PTO transmission.

According to the representation in FIG. 4, the PTO transmission 20 has an input shaft 22, a first output shaft 24, a second output shaft 28, and an intermediate shaft 26. On the input shaft 22 there are two gears 32, which are each designed to be shiftable by a shifter element 34. The two gears 32 each form, complementary to a gear 32 of the first output shaft 24, a gear pair 30. On the first output shaft 24 there is an additional gear 32 which forms a gear pair 30 with a gear 32 of the intermediate shaft 26. There is a shifter element 34 between a gear pair 30 that is provided between the input shaft 22 and the first output shaft, and between the gear pair 30 that is formed between the first output shaft 24 and the intermediate shaft 26. One or the other gear pair 30, as desired, can be connected to the second output shaft 28 by the shifter element 34. Through the design in FIG. 4, the power path can thus, as desired, be directed via one of the two gears 32 of the input shaft 22 to the first output shaft 24 directly to the second output shaft 28 and to the PTO, or with the appropriate shifting of the shifter element to the PTO via the intermediate shaft 26 and the second output shaft 28. Through this, four different gear ratios or four different power steps can be achieved.

Figure 5:
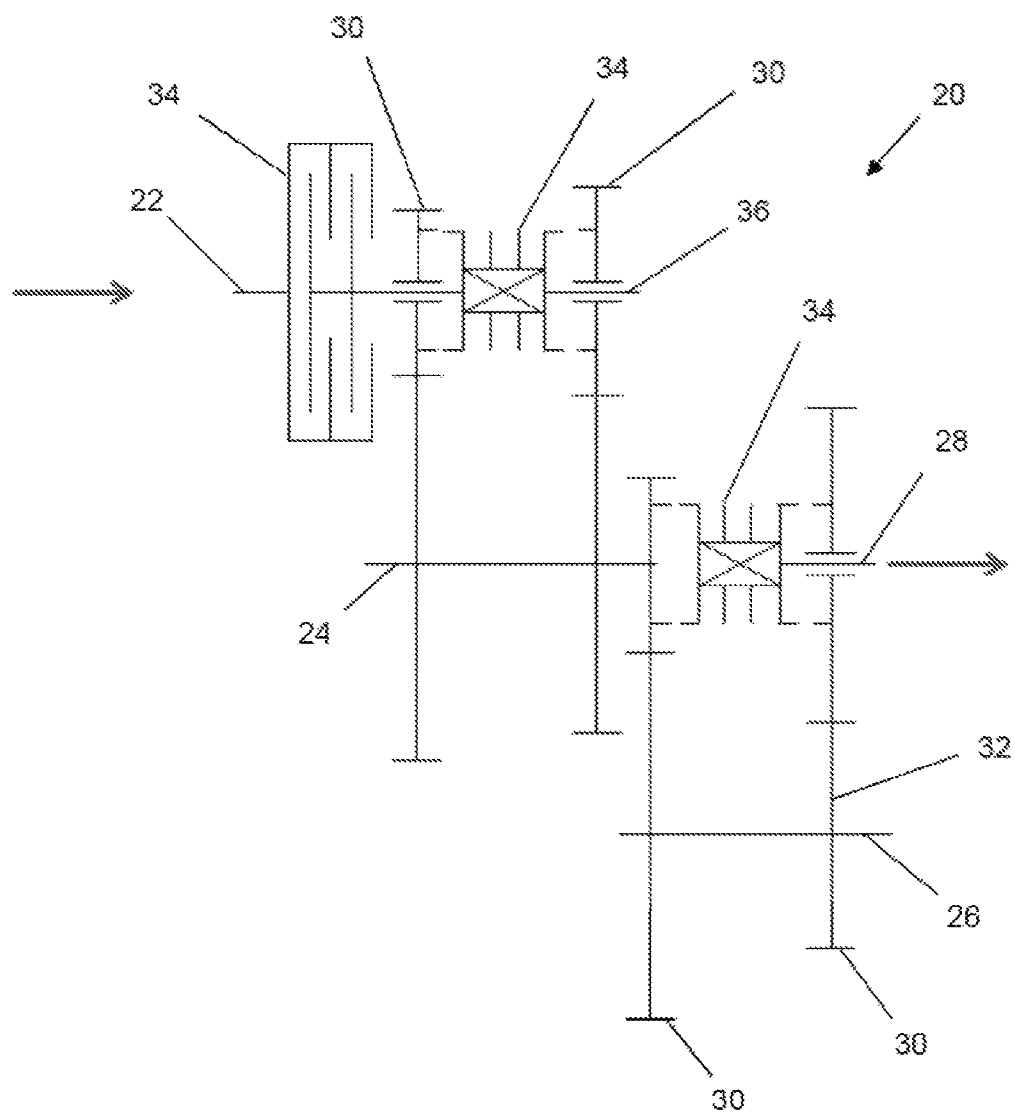
FIG. 5 shows another embodiment of a PTO transmission.

In contrast to the previous embodiment examples, a PTO transmission according to FIG. 5 has two input shafts. They split into a first input shaft 22 and a second input shaft 36. A shifter element 34 is provided between the first and the second input shaft.

The shifter element 34 serves to disconnect the PTO completely when necessary. The second input shaft 36 has two gears 32, the two of which are serviced by one shifter element 34. The two gears 32 of the second input shaft 36 each form a gear pair 30 with two gears 32 on the first input shaft 24. A third gear 32, which is in engagement with a gear 32 on the intermediate shaft 26 and forms a gear pair 30, is provided on the first output shaft 24.

Another gear 32 on the intermediate shaft 26 is in turn in engagement with a gear 32 on the second output shaft 28 and forms a fourth gear pair 30. Between the gear pair 30 of the first output shaft 24 and the intermediate shaft 26 and the gear pair 30 of the intermediate shaft 26 and the second output shaft 28 there is likewise a shifter element 34, so that, as desired, the power path can be directed from the first output shaft 24 via the gear pair 30 to the intermediate shaft 26 and via the additional gear pair 30 to the second output shaft 28, or from the first output shaft 24 directly to the second output shaft 28 to the PTO. Through this, four gear steps or power steps for the PTO can likewise be made available.

Figure 6:
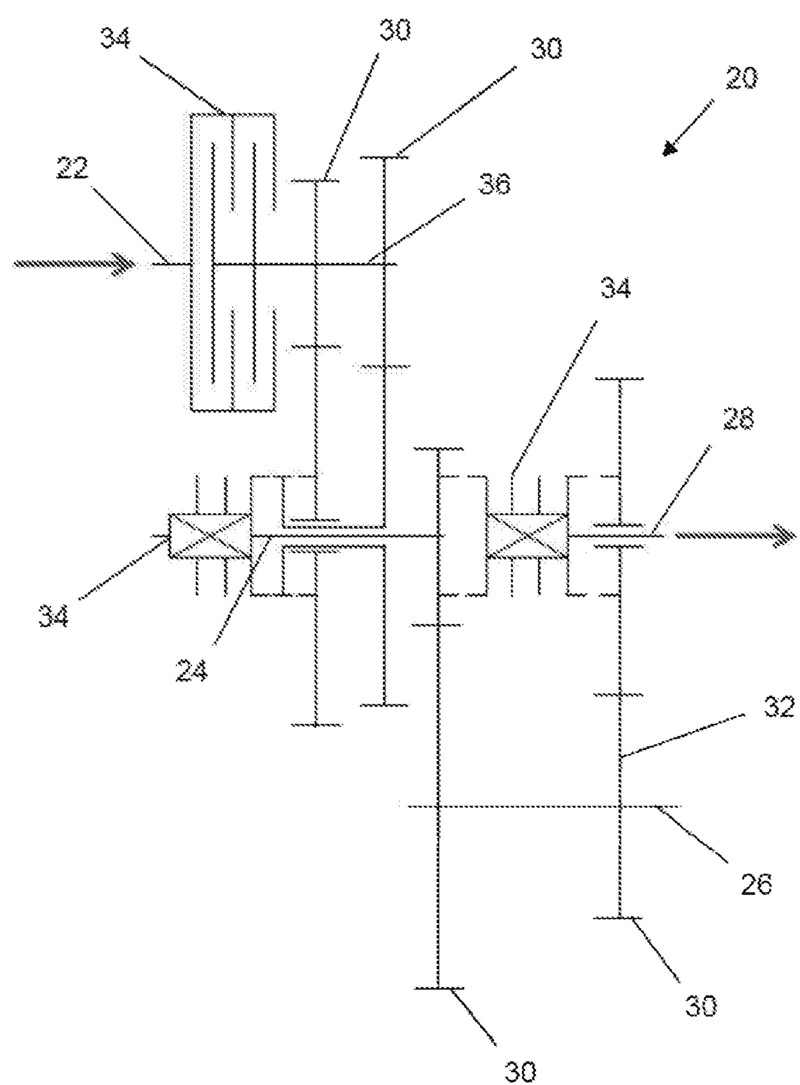
FIG. 6 shows another embodiment of a PTO transmission.

Another embodiment shown in FIG. 6 differs from the embodiment shown in FIG. 5 in that a shifter element 34 is removed from the second input shaft 36, and instead is now provided on the first output shaft 24 in order to shift between two gear pairs 30 between the second input shaft 36 and the first output shaft 24. The rest of the structure corresponds to the construction shown in the embodiment example in FIG. 5 so that four different gear steps or power steps can likewise be made available for the PTO.

Through the present disclosure, an automatic shifting can be undertaken in PTO operation without the operator having to conduct manual shifting operations. Thus, the work of the operator is lessened and the proposed method leads to a constant load factor for the vehicle and the vehicle drive, with a simultaneous savings of fuel.

All of the shifter elements 34 can be designed both as elements that can be shifted under no-load conditions or under load. In the case of shifter elements that can be shifted under load, there is additionally the advantage that a shift can be made between two different modes for the PTO operation without an interruption of tractive force.

The advantage to the use of a no-load-shiftable shifter element is the lower space requirement for it.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method for shifting a PTO transmission, comprising:

selecting a PTO output speed from one of a first PTO speed and a second PTO speed of the PTO transmission;

operating the PTO transmission in a reduced power mode at the selected PTO speed, the reduced power mode providing lower power to the PTO at the selected PTO speed than a normal operating mode;

comparing an instantaneous drive power to a maximum drive power in the reduced power mode; and when the instantaneous drive power exceeds the maximum drive power, automatically shifting the PTO transmission under load from the reduced power mode to the normal operating mode and automatically adjusting a transmission ratio of a vehicle transmission.

2. A method for shifting a PTO transmission, comprising:

selecting a PTO output speed from one of a first PTO speed and a second PTO speed of the PTO transmission;

operating the PTO transmission in a normal operating mode at the selected PTO speed, the normal mode providing higher power to the PTO at the selected PTO speed than a reduced power mode;

comparing an instantaneous drive power to a maximum drive power in a reduced power mode; and when the instantaneous drive power is less than the maximum drive power, automatically shifting the PTO transmission under load from the normal operating mode to the reduced power mode and automatically adjusting a transmission ratio of a vehicle transmission.

* * * * *